United States Patent
Kume et al.

(10) Patent No.: US 8,012,376 B2
(45) Date of Patent: Sep. 6, 2011

(54) METHOD FOR PREPARING CARBON MATERIAL FOR ELECTRODE OF ELECTROCHEMICAL DEVICES

(75) Inventors: Tetsuya Kume, Kakegawa (JP);
Yasuyuki Higaonna, Kakegawa (JP);
Kazuaki Yanagi, Kakegawa (JP)

(73) Assignee: Cataler Corporation, Shizuoka (JP)

( * ) Notice: Subject to any disclaimer, the term of this patent is extended or adjusted under 35 U.S.C. 154(b) by 172 days.

(21) Appl. No.: 12/296,695

(22) PCT Filed: Apr. 16, 2007

(86) PCT No.: PCT/JP2007/058685
§ 371 (c)(1),
(2), (4) Date: Oct. 10, 2008

(87) PCT Pub. No.: WO2007/119885
PCT Pub. Date: Oct. 25, 2007

(65) Prior Publication Data
US 2009/0272945 A1    Nov. 5, 2009

(30) Foreign Application Priority Data
Apr. 14, 2006 (JP) ................ 2006-111948

(51) Int. Cl.
*H01B 1/04* (2006.01)
*H01B 1/06* (2006.01)
*H01G 9/00* (2006.01)
*C01D 3/00* (2006.01)

(52) U.S. Cl. ...... 252/502; 252/511; 361/502; 423/449.1
(58) Field of Classification Search ............... 252/500, 252/502, 511; 423/449.1; 361/502
See application file for complete search history.

(56) References Cited

U.S. PATENT DOCUMENTS

| | | | | |
|---|---|---|---|---|
| 2,008,146 | A * | 7/1935 | Morrell | 502/433 |
| 7,317,607 | B2 * | 1/2008 | Omura et al. | 361/502 |
| 2003/0179537 | A1 * | 9/2003 | Tanaka et al. | 361/502 |
| 2006/0057052 | A1 * | 3/2006 | Takeuchi | 423/445 R |

FOREIGN PATENT DOCUMENTS

| | | |
|---|---|---|
| JP | 07307250 A | 11/1995 |
| JP | 08107048 A | 4/1996 |
| JP | 09306797 A | 11/1997 |
| JP | H09-306797 | * 11/1997 |
| JP | 11317333 | 11/1999 |
| JP | 2002025867 A | 1/2002 |
| JP | 2006-216748 | * 8/2006 |
| JP | 2006216748 A | 8/2006 |
| WO | WO 2005/038835 | * 4/2005 |

* cited by examiner

*Primary Examiner* — Mark Kopec
*Assistant Examiner* — Jaison P Thomas
(74) *Attorney, Agent, or Firm* — Millen, White, Zelano & Branigan, P.C.

(57) ABSTRACT

A method for preparing a carbon material for an electrode is provided that comprises a step for activating a mixture of a carbonous main material and a conductive additive.

17 Claims, 1 Drawing Sheet

US 8,012,376 B2

METHOD FOR PREPARING CARBON MATERIAL FOR ELECTRODE OF ELECTROCHEMICAL DEVICES

TECHNICAL FIELD

The present invention relates to a method for preparing a carbon material available for an electrode of electrochemical devices, in particular, an electrical double layer capacitor.

BACKGROUND ART

In recent years, since electrochemical devices, for example, an electrical double layer capacitor, a lithium-ion secondary battery, and the like, have the advantages of being able to easily realize reduction in size and weight thereof, they are expected to be used for power supplies for mobile devices, back-up power supplies, auxiliary power supplies for electrical or hybrid vehicles and the like. There have therefore been many attempts to improve their performance.

An electrode used in the electrochemical devices usually contains the following constituents: a current collector foil made of aluminium, stainless-steel, or the like; and an electrode layer consisting of a mixture of an active material with high-specific surface area, such as, activated carbon, a conductive additive, such as, a conductive carbon and a binder. For reducing internal resistance and increasing capacitance of the device, the activated carbon used as one of the active materials is typically processed by modifying a surface part thereof, increasing its specific surface area and the like with conventional activation methods, such as an alkaline activation method. A modification with such an activation method is also utilized for increasing capacitance of a polarizable electrode for an electrical double layer capacitor.

Japanese Unexamined Patent Publication (Kokai) No. 11-317333 discloses a carbon material for an electrical double layer capacitor which has a microcrystal carbon similar to a graphite-like carbon manufactured by operating an activation processing to a carbon material, wherein the interlayer distance of the microcrystal carbon is 0.365 nm to 0.385 nm. Japanese Unexamined Patent Publication (Kokai) No. 2002-25867 discloses a nonporous carbon material for use in an electric double-layer capacitor, wherein the material consists of microcrystalline carbon like graphite, the carbon being a nonporous carbon having a specific surface area of less than 270 $m^2/g$, and wherein interlayer distance of the carbon is 0.360 to 0.380 nm.

DISCLOSURE OF INVENTION

In a conventional method for preparing an electrode for electrochemical devices, it is common for activated carbon to be subjected to a process like the activation method so that some physical properties thereof like specific surface area would be adjusted to the desired extent, and to be kneaded and rolled together with a conductive additive and a binder, whereby the resultant sheet containing the activated carbon is bonded to a current collector. Unfortunately, the electrode thus obtained still has high internal resistance, and insufficient capacitance for electrical double layer capacitors.

Furthermore, in the case of the electric double layer capacitor with the electrodes made from the nonporous carbon material as disclosed in Japanese Unexamined Patent Publication No. 2002-25867, since the material has a low-specific area, the rate of electrolyte diffusion is slow, and interface resistance is increased between the electrolyte and the carbon material, which result in the capacitor having high-internal resistance. However, in the case where the electrode having high-internal resistance and low-capacitance is used for so-called large volume capacitors which have increased in demand in recent years, such as a power capacitor, it is a serious problem that capacitors with such physical properties cannot quickly discharge and charge.

Accordingly, it is an object of the present invention to provide a method for preparing a carbon material used for electrochemical devices, in particular, an electric double layer capacitor which has low-internal resistance and high-capacitance in a well-balanced manner.

After careful consideration of the above problem, the present inventors have found that this can be solved by blending a conductive additive in the step of activating a carbonous main material, whereby the electrochemical device provided with the resultant carbon electrodes can show substantial reduction in internal resistance. Furthermore, according to the present inventors, it has also been found that an electric double layer capacitor provided with the carbon electrodes can show an increase in capacitance as well as a reduction in internal resistance.

Therefore, the present invention provides a method for preparing a carbon material for an electrode comprising a step of activating a mixture of a carbonous main material and a conductive additive.

According to the present method for preparing an electrode material, the electrochemical device provided with the electrode thus obtained has improved conductivity and interface resistance of the electrode has decreased, whereby internal resistance of the device also can be reduced. Without being bound to any particular theory, it is believed that activating the mixture of the carbonous main material and the conductive additive could bring about a change in orientation of carbon crystals in the active material obtained therefrom, and that in addition to improved conductivity, wettability of an electrolytic solution onto the surface of the crystals and diffusion rate of the electrolytic solution and electrolyte therein can be improved, which could result in reduced internal resistance.

The carbon material obtained from the present method, as used as a material for an electrode of an electrochemical device, can reduce internal resistance of the devices compared to the prior art, and as used as a material for an electrode of an electrical double layer capacitor, can reduce internal resistance and increase capacitance of the capacitor in a well-balanced manner. Therefore, the present carbon material is suitable for a polarizable electrode material used for electrical double layer capacitors, in particular preferably, an electrode material used for large volume capacitors, for example, hybrid capacitor wherein high-energy density is required. It also could be applied to electrodes of all kinds of electrochemical devices including a lithium-ion battery and the like wherein reduction in internal resistance is required.

BEST MODE FOR CARRYING OUT THE INVENTION

Figure 1:
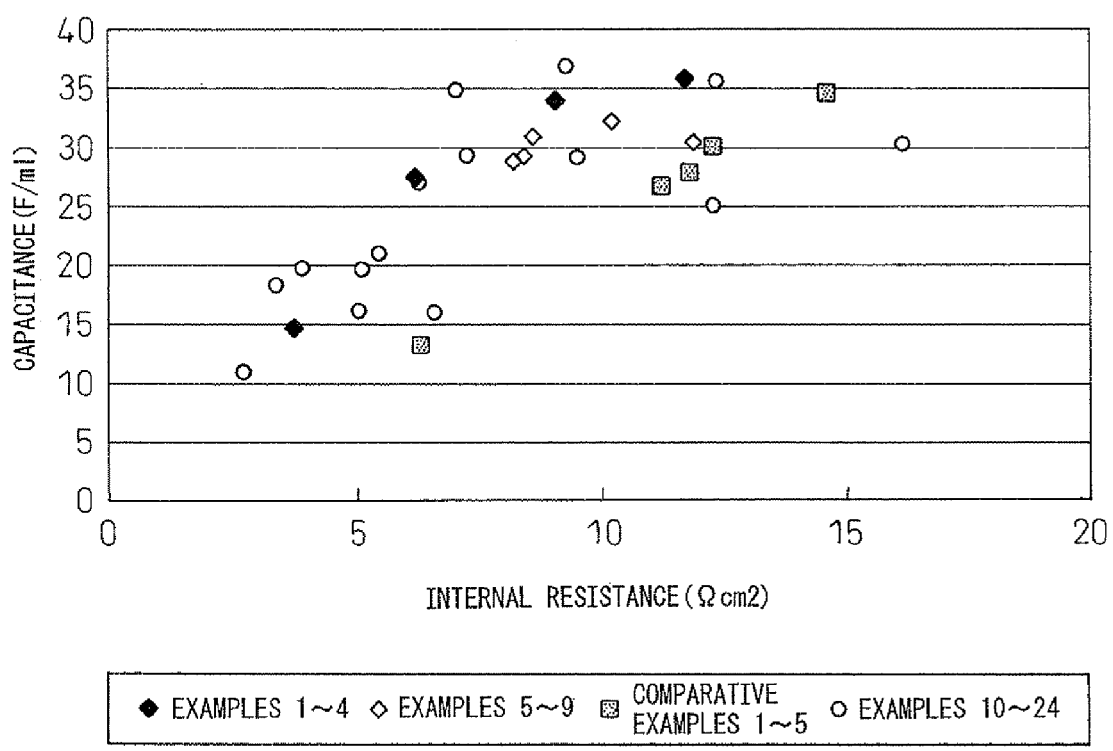
FIG. 1 is a graph showing the relationship between internal resistances ($\Omega cm^2$) and capacitances (F/ml) of electrical double layer capacitors provided with electrodes prepared using the carbon materials of Examples 1-24 and Comparative Examples 1-5.

The term "carbonous main material" as used herein refers to a carbon-based material consisting primarily of such as activated carbon, conductive carbon and the like which can absorb and desorb ions, wherein the conductive additive is not added into the material at least before a step for activating the material. The raw material of the carbonous main material can be any kind of material being widely used in the production of an electrode for electrochemical devices. Exemplary raw material of the carbonous main material includes, but is not limited to, soft carbons such as petroleum- and coal-pitches, and petroleum- and coal-cokes obtained by calcining pitch materials, poly(vinyl chloride) (PVC) carbon and the like, and hard carbons such as carbon black, poly(vinylidene chloride) (PVDC) carbon, sugar carbons, cellulose carbons, carbons from phenol-formaldehyde resin, coals, charcoals and the like. It is preferred to use soft carbons, in particular, petroleum- and coal-derived materials, such as, petroleum- and coal-pitches, or petroleum- and coal-cokes, because an electrodes for electrochemical devices with high-capacitance could be obtained. Among them, petroleum-derived materials like petroleum-pitch are particularly preferable as they are relatively amorphous and less oriented, and have the advantage of being able to control microstructure of the carbonous main material to the desired extent by regulating conditions in the carbonization step thereof. In addition, the form of the raw material of the carbonous main material is not specifically limited, and can be in any form, such as powder, particle, or fiber.

For example, when a soft carbon like petroleum-pitch is used as the carbonous main material, conventional methods for preparing carbon materials used for electrode materials are usually through the following main steps: 1) coking; 2) carbonization; 3) activation; and 4) grinding. In this case, before the soft carbon is provided to the activation step, it is heated under increased pressure by a conventional coking step, such as the delayed coking process so that it is precarbonized by heating, and then is highly carbonized at further elevated temperature. For example, such a precarbonization can be carried out at the temperature of 300 to 500 degrees C., and the following highly carbonization step be at the temperature of 500 to 900 degrees C. As the result of the carbonization step, the carbon crystals become high density, i.e., high orientation. On the other hand, when a hard carbon is used, the coking and carbonization steps are not necessarily required unlike a soft carbon. Also, the other steps are not specifically limited and arbitrary, except that the step of activating the mixture of the carbonous main material and the conductive additive is required as described herein below.

In the above highly carbonization step, calcining the raw material of the carbonous main material at elevated temperature can play a role in eventually obtaining an electrode material with low-specific surface area. On the other hand, a carbon material for an electrode which has high-specific surface area can be obtained by calcining the raw material at low temperature. In order to produce an electrode for electrochemical devices wherein its internal resistance is reduced and capacitance is increased in a well-balanced manner, a carbon material for an electrode can be subjected to a highly carbonization step heating at further elevated temperature, such as, 700 to 950 degrees C. In addition, if the reduced internal resistance is given priority over the increased capacitance, this highly carbonization step can be carried out at relatively low temperature. However, as will be understood by a person skilled in the art, the carbonization step in the present method is not specifically limited to the above mentioned heating temperature, and specific surface area of the carbon material varies depending on the other factors including heating period and the like.

According to the conventional methods for producing electrodes as mentioned above, so far at least, in the activation step, conductive additive has never been added. Rather, in the following step of kneading the additive in the preparation of an electrode, it has been added together with a binder. On the other hand, in the present method for preparing a carbon material for an electrode, the conductive additive is added in the activation step in the preparation of the carbon material. Obviously, it should be appreciated that a further conductive additive can be added to the carbon material for an electrode after subjected to the present method, even in the kneading step in the process of preparing electrodes. In addition, it is not suitable that the conductive additive be added before the above activation step, for example, the above mentioned step 2) of carbonization as it could be so hard to mix with the carbonous main material, and to attain sufficient reduction in internal resistance and increase in capacitance of the devices compared to the prior art.

The term "conductive additive" as used herein refers to a material which can be used to contribute to increase in conductivity of an active material formed by going through the above activation and grinding processes in conventional methods for preparing an electrode, wherein the increased conductivity can be due to the location of the conductive additive between particles of the active material, or between particles of the active material and those of the current collector. Exemplary conductive additive includes, but not limited to, carbon materials, metallic materials and the like. Preferably, the conductive additive is carbon black, carbon nanotube, graphite, fullerene and the like as these show high conductivity and stability. In addition, the conductive additive can also be used in the kneading step in the preparation of an electrode as well as the above activation step. In this case, the conductive additive used in these steps can be the same or different.

In the present invention, the conductive additive can be activated after mixing about 0.5 to 100 part by weight of it with 100 part by weight of the carbonous main material. In this quantitative ratio, if the amount of the conductive additive exceeds 100 part by weight, it would be so hard to be mixed with the carbonous main material. Also, in the case where more than 100 part by weight of the conductive additive is used to mix with the carbonous main material, it is not preferable because the advantageous effect of the present invention, i.e., the increased capacitance of the resultant electrochemical device can be not enough compared to a conventional product prepared using the carbon material having a comparable specific surface area though the internal resistance thereof can be reduced. On the other hand, if the amount of the conductive additive is less than 0.5 part by weight to 100 part by weight of the carbonous main material, the advantageous effect of attaining both of reduction in internal resistance and increase in capacitance can be not enough. In order to reduce the internal resistance and increase in capacitance of the electrochemical device, it is preferable that the amount of the conductive additive used at the activation step be from 1 to 30 part by weight, in particular preferably, about 5 to 20 part by weight, to 100 part by weight of the carbonous main material.

The term "activation" as used herein refers to any treatment to increase the specific surface area or interplanar spacing of the carbonous main material, preferably with an acid, an alkaline or water vapor. In the case of acid activation, zinc chloride, phosphoric acid and the like can be used, and in the case of alkali activation, alkali metal hydroxides including potassium hydroxide, sodium hydroxide, lithium hydroxide and the like and alkali metal carbonates including potassium carbonate, sodium carbonate and the like can be used, but are not limited thereto. For the reason of easiness of controlling the surface area and interplanar spacing, alkali activation is preferred by means of potassium hydroxide. When acid or alkali activation is employed, the resulting activated mixture is cleaned with pure water so as to remove the acid or alkali compound after the activation step.

In addition, the activation treatment can be carried out by maintaining the carbonous main material and the conductive additive at 700 to 900 degrees C. under nitrogen atmosphere or under a mixed gas of nitrogen/water vapor for 1 to 10 hours. However, it will be obvious for a person skilled in the art that the activation treatment is not limited to such a condition as the present invention is characterized by mixing the carbonous main material and the conductive additive before the activation step.

By activating the mixture of the carbonous main material and the conductive additive, surface conditions of the electrode material can be improved, and its absolute value of mesopore (2-50 mm) volume can be increased. In addition, a pore volume of the carbon material for an electrode which is prepared by the present method, can be determined by a pore distribution measurement using nitrogen adsorption method. It is believed that increasing the absolute value of mesopore volume could allow to produce the carbon material for an electrode of electrochemical devices having a low-internal resistance, in particular, for electrodes of an electrical double layer capacitor wherein its internal resistance is reduced and capacitance is increased in a well-balanced manner. The term "carbon material for an electrode" as used herein refers to ones containing a carbonous material as a constituent material of the electrode, not ones wherein its primary constituent is carbonous material. Furthermore, the above carbon material for an electrode can contain the publicly known components) other than the carbonous material as tong as it does not affect performance of the electrochemical device.

Subsequently, the mixture of the carbonous main material and the conductive additive after the activation treatment is milled to a desired particle size. The carbonous material treated by such a powderization is calcined at an elevated temperature under hydrogen atmosphere so that the present carbon material for an electrode could be prepared.

In the method for manufacturing the electrode, one of the methods known in the prior art can be used, such as, a publicly known process for producing a sheet electrode or slurry electrode, and the like. For example, in the case of an electrical double layer capacitor, an electrode layer can be manufactured by kneading the electrode material obtained by the present method with the above-mentioned conductive additive and a binder, such as, polytetrafluoroethylene, polyvinylidene-fluoride, carboxymethylcellulose and the like, and then rolling them so that they are formed in a sheet shape.

According to the present method, a BET specific surface area of the obtained carbon material for an electrode can vary depending on the used carbonous main material. As described above, if it is via the carbonization step like the case of soft carbon, its BET specific surface area would be dependent on calcination temperature at the carbonization step. The higher the calcining temperature is, the lower the BET specific surface area is, and the lower the calcining temperature is, the higher the BET specific surface area is. In addition to control of the amount of the conductive additive at the activation thereof, controlling the BET specific surface area of the carbon material for an electrode can regulate balance between internal resistance and capacitance of the electrochemical devices to a desired extent.

As for an interplanar spacing of the carbon material prepared according to the present method, about 0.36 nm will be required as measured by X-ray diffractometer (RINT-2000, Rigaku Co.). If the spacing is too long, it would be impossible for the electrical double layer capacitor as end-product to charge and discharge electricity at high-voltage, and be hard to obtain the increased capacitance. The interplanar spacing can be controlled by alteration of a raw material of the carbonous main material, modification of conditions at the coking, carbonization and alkali activation steps, and the like. For example, in the alkali activation, lowering the temperature at the alkali activation would reduce the interplanar spacing, and vice versa.

The invention is further illustrated by the following non-limiting examples.

EXAMPLES

Example 1

A petroleum-pitch (MPN-Bt, Adchemco Co.) was used as the carbonous main material. The pitch was precarbonized by heating it according to the delayed coking process (coking step), and furthermore heated at 750 degrees C. under pressure of 0.15 Pa for one hour to highly carbonize it (carbonization step).

Subsequently, 10 part by weight of carbon black (Denka Black, Denki Kagaku, co.) as a conductive additive was added into 100 part by weight of the carbonized pitch, and mixed them well. To this mixture was added potassium hydroxide in a weight ratio of 1:2 (the mixture:potassium hydroxide), mixed them together, and activated by maintaining them at 800 degrees C. under nitrogen atmosphere for 4 hours. After that, the activated mixture was cleaned with hydrochloric acid and pure water to remove the potassium hydroxide.

The mixture treated by the activation was milled to an average particle size of about 10 micrometer by impact crushing using a dry impact mill (Vibro Mill, Uras Techno co.) By maintaining it at 700 degrees C. under hydrogen atmosphere for 4 hours, a carbon material for an electrode according to the present invention was prepared (Example 1).

The BET specific surface area per gram of the said carbon material was measured by means of a specific surface area measuring apparatus (NOVA 3000, Yuasa Tonics Inc.), and found to be 120 $m^2$/g. Also, it was confirmed that interplanar spacing of the carbon material was 0.367 nm as measured by a X-ray diffractometer (RINT-2000, Rigaku Co.).

Examples 2-4

In order to study how raw materials of the carbonous main material affect an internal resistance and capacitance of electrochemical devices, three carbon materials for an electrode in the present invention (Examples 2 to 4) were prepared in the same manner as in Example 1 except for modification of the following conditions: the heating temperature in the coking step as described in Example 1 was changed to 900 degrees C. (Example 2) and 600 degrees C. (Example 3), and a raw material of the carbonous main material was changed from the petroleum-pitch as a soft carbon to a commercially-available anthracite as a hard carbon (Example 4).

The BET specific surface areas of these carbon materials thus obtained were 70 $m^2$/g (Example 2), 530 $m^2$/g (Example 3) and 1780 $m^2$/g (Example 4), respectively.

Examples 5-9

In order to study how an amount of the conductive additive affects an internal resistance and capacitance of electrochemical devices, the amount of the conductive additive at the activation step in Example 1 was changed to 2, 5, 25, 40 or 80 parts by weight to prepare five carbon materials for electrodes in the present invention (Examples 5 to 9, respectively). The other conditions are the same as described in Example 1.

Comparative Example 1-5

Under the same condition as in each of Examples 1 to 4, the corresponding four carbon materials for electrodes were prepared as Comparative Examples 1 to 4 provided that the conductive additive was not added before the alkali activation step. The materials thus obtained had the BET specific surface areas of 110 $m^2/g$ (Comparative Example 1), 70 $m^2/g$ (Comparative Example 2), 500 $m^2/g$ (Comparative Example 3), and 1700 $m^2/g$ (Comparative Example 4), respectively. Furthermore, in order to ensure that the presence or the absence of the conductive additive has no effect on this experiment, a carbon material of Comparative Example 5 was prepared wherein 10 part by weight of carbon black (Denka Black, Denki Kagaku, co.) was added to 100 part by weight of the carbon material of Comparative Example 1. The BET specific surface area of the carbon material of Comparative Example 5 was 130 $m^2/g$.

Preparation of Polarized Electrode for Electrical Double Layer Capacitor

According to a conventional method for preparing a polarized electrode for electrical double layer capacitor, 100 part by weight of the carbon material for an electrode of each of Examples 1-9 and Comparative Example 1-5 was mixed with 20 part by weight of polyvinylidene fluoride (KF Polymer L # 9210, Kureha Chemical Industry Co.) as a binder and 10 part by weight carbon black (Denka Black, Denki Kagaku, co.) as a conductive additive.

The resulting materials of Examples 1-9 and Comparative Examples 1-5 were individually subjected to a vacuum kneading process using T.K. HIVIS MIX® manufactured by Tokushu Kika Kogyo Co., Ltd, and then coated on an aluminium foil by means of Mini Coater manufactured by Thank-Metal Co. Ltd. so that it wad formed into a sheet. Furthermore, the sheet was densified by a roll press machine manufactured by Thank-Metal Co. Ltd, and then cut into pieces 5 cm in length to obtain a electrode sheet.

Assembling of Capacitor

Each coated side of two electrode sheets thus obtained were arranged in face-to-face relation so as to sandwich a separator (TF4060, Nippon Kodoshi Co.). After that, they were dried under a vacuum at 150 degrees C. for four hours, and impregnated with a electrolyte (1M tetraethylammonium tetraflouraborate (TEA. BF4)/propylene carbonate (PC) solution, Kishida Kagaku Co.). A capacitor was assembled by incorporating them into an aluminum laminate pack.

Measurement of Internal Resistance and Capacitance

To assess characteristic features of the capacitors manufactured from the carbon materials of Examples 1-9 and Comparative Examples 1-5, their individual internal resistance ($\Omega cm^2$) and capacitance (F/ml) were measured. The measurement was carried out by means of SM8 manufactured by Hokuto Denko Co. In the measurement of the capacitance, charge and discharge currents were 2 mA/$cm^2$, charge voltage in the cases of Examples 1-3 and 5-9 and Comparative Examples 1-3, and 5, was 3.5 V and in other cases was 2.5V. On the other hand, all discharge voltages were 0 V. In addition, the internal resistance (IR) was measured on the basis of increase in IR for 0.1 second just after the discharge. All measurements were assessed at room temperature (25 degrees C.). The results are shown in Table 1 and FIG. 1.

TABLE 1

| | Amount of conductive additive (part by weight) | | | | | | |
| --- | --- | --- | --- | --- | --- | --- | --- |
| | Just before activation step | Just after activation step | Kneading step | Specific surface area ($m^2/g$) | Interplanar spacing (nm) | Internal resistance ($\Omega cm^2$) | Capacitance (F/ml) |
| Example 1 | 10 | 0 | 10 | 120 | 0.367 | 9.1 | 34.0 |
| Example 2 | 10 | 0 | 10 | 70 | 0.367 | 11.7 | 35.8 |
| Example 3 | 10 | 0 | 10 | 530 | 0.369 | 6.2 | 27.5 |
| Example 4 | 10 | 0 | 10 | 1780 | 0.375 | 3.7 | 14.7 |
| Example 5 | 2 | 0 | 10 | 110 | 0.365 | 11.9 | 30.4 |
| Example 6 | 5 | 0 | 10 | 120 | 0.367 | 10.2 | 32.2 |
| Example 7 | 25 | 0 | 10 | 125 | 0.366 | 8.6 | 30.9 |
| Example 8 | 40 | 0 | 10 | 125 | 0.367 | 8.4 | 29.3 |
| Example 9 | 80 | 0 | 10 | 130 | 0.367 | 8.2 | 28.8 |
| Comparative Example 1 | 0 | 0 | 10 | 110 | 0.365 | 12.3 | 30.1 |
| Comparative Example 2 | 0 | 0 | 10 | 70 | 0.366 | 14.6 | 34.5 |
| Comparative Example 3 | 0 | 0 | 10 | 500 | 0.368 | 11.2 | 26.8 |
| Comparative Example 4 | 0 | 0 | 10 | 1700 | 0.374 | 6.3 | 13.4 |
| Comparative Example 5 | 0 | 10 | 10 | 130 | 0.364 | 11.8 | 27.9 |

As shown in Table 1 and FIG. 1, the capacitances of the capacitors manufactured using the carbon materials of Examples 1-4 were increased while their internal resistances were reduced compared to those prepared by the carbon materials of Comparative Examples 1-4. Also, as is clear from the results of Examples 5-8, their internal resistances were decreased with increasing the amount of the conductive additive. On the other hand, the capacitances were also increased in proportion to the amount of the added conductive additive. The increase, however, slowed down gradually from 10 part by weight of the conductive additive (Example 1), and, when it reached 40 part by weight, the capacitance became approximately the same as that of Comparative Example 1.

As to such a effect due to increase in the amount of the conductive additive, the electrical double layer capacitor manufactured by using the carbon material of Example 1 for an electrode yielded excellent results in comparison with that of Comparative Example 5 wherein carbon black was added in an amount equal to the total amount of the added carbon black in Example 1 after the alkali activation. From these results, it is obvious that the above advantageous effects of the present invention were attributed to the addition of the conductive additive in the activation step, not the increase in the amount of the conductive additive.

Since reduction in internal resistance and increase in capacitance of Example 4 manufactured by using the anthracite as a hard carbon were also confirmed compared to Comparative Example 4, it can be understood that the present method is not affected by a raw material of the carbonous main material to be used.

In all the preparation of the electrodes as above stated, carbon black was added in the kneading step as a conductive additive. The following study was made to see how the absence of a conductive additive in the kneading step would affect an internal resistance and capacitance.

Examples 10-14

On the basis of the amounts of the conductive additives, which are given in Table 2 below, five carbon materials for electrodes (Examples 10 to 14) were prepared in a similar manner to the above Examples. All the BET specific surface areas were 70 m$^2$/g, and all the interplanar spacings were 0.366 nm. Subsequently, the manufacturing process of preparation of a polarized electrode for an electrical double layer capacitor as mentioned above was used to prepare the electrode by means of the carbon materials for electrodes, provided that the conductive additive was not added in the kneading step.

Examples 15-19

According to the amounts of the conductive additives, which are given in Table 2 below, further five carbon materials for electrodes (Examples 15 to 19) were prepared in a similar manner to the above Examples. All of the BET specific surface areas were 500 m$^2$/g, and all the interplanar spacings were 0.368 nm. As with Examples 10 to 14, electrodes were prepared using the carbon materials for an electrode without addition of the conductive additive in the kneading step.

Examples 20-24

Based on the amounts of the conductive additives, which are given in Table 2 below, further five carbon materials for electrodes (Examples 20 to 24) were prepared in a similar manner to the above Examples. All the BET specific surface areas were 2300 m$^2$/g, and all the interplanar spacings were 0.380 nm. As with Examples 10 to 14, electrodes were prepared using the carbon materials for electrodes without addition of the conductive additive in the kneading step.

Table 2 and FIG. 1 show the measured results of the internal resistances and capacitances of the capacitor provided with the above electrodes. In addition, the measurement conditions thereof were the same as those given above.

TABLE 2

| | Amount of conductive additive (part by weight) | | | Addition of conductive additive | Specific surface area (m$^2$/g) | Interplanar spacing (nm) | Internal resistance (Ωcm$^2$) | Capacitance (F/ml) |
| | Just before activation step | Just after activation step | Kneading step | | | | | |
| --- | --- | --- | --- | --- | --- | --- | --- | --- |
| Example 10 | 100 | 0 | 0 | Before activation step | 70 | 0.366 | 5.5 | 21.0 |
| Example 11 | 45 | 0 | 0 | Before activation step | 70 | 0.366 | 7.1 | 34.8 |
| Example 12 | 25 | 0 | 0 | Before activation step | 70 | 0.366 | 9.3 | 36.8 |
| Example 13 | 10 | 0 | 0 | Before activation step | 70 | 0.366 | 12.4 | 35.5 |
| Example 14 | 5 | 0 | 0 | Before activation step | 70 | 0.366 | 16.1 | 30.1 |
| Example 15 | 100 | 0 | 0 | Before activation step | 500 | 0.368 | 5.0 | 16.2 |
| Example 16 | 45 | 0 | 0 | Before activation step | 500 | 0.368 | 6.3 | 27.1 |
| Example 17 | 25 | 0 | 0 | Before activation step | 500 | 0.368 | 7.3 | 29.3 |
| Example 18 | 10 | 0 | 0 | Before activation step | 500 | 0.368 | 9.5 | 29.1 |
| Example 19 | 5 | 0 | 0 | Before activation step | 500 | 0.368 | 12.3 | 25.0 |
| Example 20 | 100 | 0 | 0 | Before activation step | 2300 | 0.380 | 2.7 | 10.9 |
| Example 21 | 45 | 0 | 0 | Before activation step | 2300 | 0.380 | 3.4 | 18.3 |
| Example 22 | 25 | 0 | 0 | Before activation step | 2300 | 0.380 | 3.9 | 19.8 |
| Example 23 | 10 | 0 | 0 | Before activation step | 2300 | 0.380 | 5.1 | 19.7 |
| Example 24 | 5 | 0 | 0 | Before activation step | 2300 | 0.380 | 6.6 | 16.0 |

In the results, the electrodes prepared using the carbon materials of Example 10-24, in spite of the absence of the conductive additive in the kneading step, showed the reduced internal resistances and the increased capacitances in a well-balanced manner. Also, regardless of the specific areas of the carbon materials, the internal resistances thereof were reduced as the amount of the conductive additive was increased.

However, even if the conductive additive was added before the activation step, the reduction in internal resistance was not attained in the cases of Examples 14 and 19 wherein the added conductive additive was small in amount like 5 part by weight.

According to the present invention, preliminarily adding the conductive additive which has been added in the kneading step in conventional methods of manufacturing electrodes, can provide a carbon material for an electrode of electrochemical devices in a well-balanced manner where internal resistance is reduced and capacitance is increased. Accordingly the carbon material for an electrode in the present invention is suitable for preparing electrodes for large volume capacitors wherein high-energy density is required, or lithium-ion batteries wherein reduction in internal resistance is required.

The invention claimed is:

1. A method for preparing a carbon material for an electrode, said method comprising:
    mixing a carbonous main material and a conductive additive to form a mixture, and then directly activating the mixture of a carbonous main material and a conductive additive, wherein said conductive additive is carbon black.

2. A method according to claim 1, wherein said mixture contains 0.5 to 100 part by weight of said conductive additive per 100 parts by weight of said carbonous main material.

3. A method according to claim 1, wherein said carbonous main material is soft carbon and said carbonous main is carbonized before being mixed with the conductive additive.

4. A method according to claim 1, wherein said carbonous main material is petroleum- or coal-derived material.

5. A method according to claim 1, wherein said carbonous main material is a hard carbon.

6. A method according to claim 1, wherein said conductive additive is a carbonous material.

7. A method according to claim 1, wherein, after said mixture is activated, further conductive additive is added to said mixture of carbonous main material and conductive additive.

8. A method for preparing a sheet electrode from a carbon material, said method comprising:
    preparing a carbon material according to claim 7, kneading the carbon material with and a binder, and then rolling the resultant mixture to form a sheet shape.

9. A method for according to claim 8, wherein said binder is polytetrafluoroethylene, polyvinylidene-fluoride, or carboxymethylcellulose.

10. A method according to claim 1, wherein said mixture contains 1 to 30 parts by weight of said conductive additive per 100 parts by weight of said carbonous main material.

11. A method according to claim 1, wherein said mixture contains 5 to 20 parts by weight of said conductive additive per 100 parts by weight of said carbonous main material.

12. A method according to claim 1, wherein said mixture of carbonous main material and conductive additive is activated by treatment with an acid, an alkaline or water vapor.

13. A method according to claim 12, wherein said mixture of carbonous main material and conductive additive is activated by treatment with zinc chloride, phosphoric acid, alkali metal hydroxide, or an alkali metal carbonate.

14. A method according to claim 12, wherein said mixture of carbonous main material and conductive additive is activated by maintaining said mixture at 700 to 900 degrees C. under nitrogen atmosphere or under a mixed gas of nitrogen and water vapor for 1 to 10 hours.

15. A method according to claim 12, wherein after said mixture of carbonous main material and conductive additive is activated, the mixture is milled to a desired particle size and calcined at an elevated temperature under hydrogen atmosphere.

16. A method for preparing a sheet electrode from a carbon material, said method comprising:
    preparing a carbon material according to claim 1, kneading the carbon material with and a binder, and then rolling the resultant mixture to form a sheet shape.

17. A method for according to claim 16, wherein said binder is polytetrafluoroethylene, polyvinylidene-fluoride, or carboxymethylcellulose.

* * * * *